Jan. 23, 1951 J. A. WORCESTER, JR 2,539,218
TEMPERATURE COMPENSATING SYSTEM FOR OSCILLATORS
Filed June 21, 1949
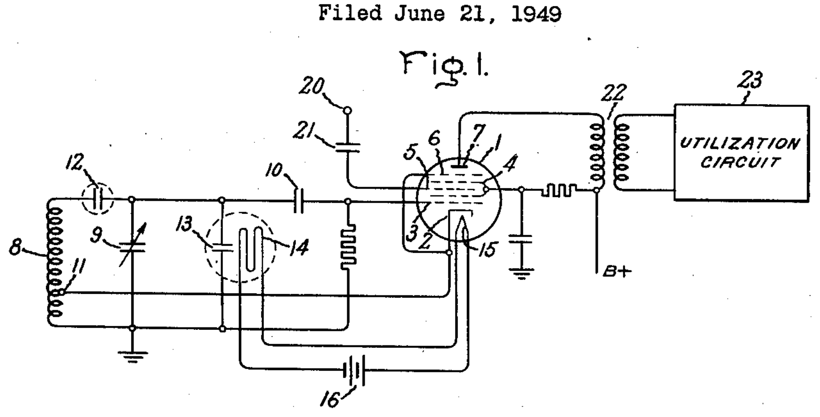
Fig. 2.
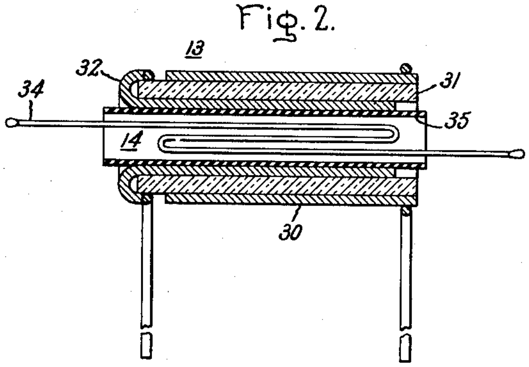
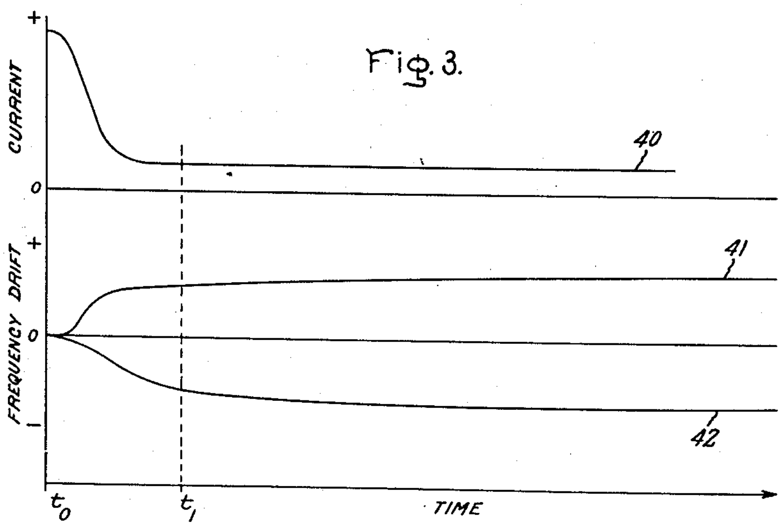
Inventor:
Joseph A. Worcester Jr.,
by Merton D. Morse
His Attorney.

Patented Jan. 23, 1951

2,539,218

UNITED STATES PATENT OFFICE 2,539,218

TEMPERATURE COMPENSATING SYSTEM FOR OSCILLATORS

Joseph A. Worcester, Jr., Syracuse, N. Y., assignor to General Electric Company, a corporation of New York Application June 21, 1949, Serial No. 100,394

4 Claims. (Cl. 250—36)

This invention relates to a novel system of temperature compensation for controlling the operating frequency of electronic oscillators.

In the common types of radio receivers operating on the superheterodyne principle of reception, it is essential that the frequency of a local oscillator be accurately controlled. Normally, this is insured through careful design of the oscillator circuit and its component parts. However, due to the fact that the temperature of the receiver rises when it is operating, there is a certain amount of resulting frequency drift which can only be eliminated by applying special techniques.

The frequency drift of an oscillator caused by temperature rise in a receiver from the moment when it is initially switched on, can generally be considered in two parts, a long term temperature drift, and a short term temperature drift. The long term drift is caused by the rise in temperature of all the elements in the oscillator circuit, as the temperature of the receiver tends towards a new equilibrium with the ambient temperature. This causes an increase in the physical dimensions of the coils and other circuit elements, causing, in turn, changes in their reactances and in the resulting frequency of oscillation. The short term drift, on the other hand, is caused by the heating of the internal elements of the oscillator tube, and lasts but a few minutes after the receiver is initially turned on.

The long term drift is relatively easy to compensate for, and this is usually achieved by employing a negative temperature coefficient capacitor as part of the tuning capacitance. The short term drift, on the other hand, has generally proven much more difficult to compensate for. If an attempt is made to compensate for it by increasing the size of the usual negative temperature coefficient capacitor, the long term drift is over-compensated and a long term drift in the reverse direction occurs.

Accordingly, it is an object of this invention to provide a new and improved system for compensating for the frequency drift in an oscillator occurring as a result of the heating of internal elements in the oscillator tube.

A further object of this invention is to provide a compensation system for reducing both long and short term frequency drift of the oscillator in a radio receiver.

For further objects and advantages and for a better understanding of the invention, attention is now directed to the following description and accompanying drawing. The features of the invention believed to be novel are more particularly pointed out in the appended claims.

In the drawings:

Fig. 1 is a schematic illustration of an oscillator circuit embodying my invention;

Fig. 2 is a detailed cross-sectional view of part of the circuit of Fig. 1 with which my invention is more particularly concerned; and Fig. 3 contains some curves illustrating the operating characteristics of an oscillator constructed in accordance with my invention.

Referring to Fig. 1, there is shown an oscillator circuit comprising an electron discharge device or tube 1, of the type commonly known as a pentagrid converter. This type of tube has a plurality of screen or grid electrodes which permit it to operate as both a mixer and a local oscillator, so as to provide frequency conversion of an input signal without the use of any other tubes. The oscillator portion of the tube comprises a cathode 2, an oscillator grid 3, and an oscillator anode 4, which is actually a double screen shielding the oscillator portion from the mixer portion of the tube. The mixer portion comprises a control grid 5, a suppressor grid 6, and an anode 7.

The oscillator section of the tube is connected in a conventional form of Hartley circuit which comprises an inductance 8 and a tuning capacitor 9, forming together a resonant circuit of which one side is grounded and the other side is connected, through a coupling capacitor 10, to the oscillator grid 3. The cathode 2 is connected to a tap 11 on the coil 8. The resonant circuit comprises, in addition, a padding capacitor 12 of the temperature compensating type which is connected in series between the coil 8 and the variable capacitor 9. Capacitor 12 serves to reduce the rate of change of frequency in the oscillator circuit when the tuning capacitor 9 is varied, so as to permit tracking of this circuit with other high frequency circuits, which amplify the signals picked up by an antenna and supply them to the mixer section of converter 1. In addition, capacitor 12 serves as a compensator for the long term drift of the oscillator, as will be explained subsequently.

A capacitor 13 is connected in parallel with tuning capacitor 9 and serves as a short term drift compensator. A heater winding 14, operating in conjunction with compensating capacitor 13, is connected in series with the heater winding 15 of tube 1 to a voltage source represented conventionally by a battery 16. Capacitor 13 is of a special construction, similar to that of capacitor 12 as will be explained subsequently.

Received signals are supplied to terminal 20, and therefrom through capacitor 21, to the control grid 5 of tube 1. The anode 7 is connected through a suitable transformer 22 to a source of operating potential indicated by B+, and transformer 22 is connected to a utilization circuit 23.

The temperature compensating capacitors 12 and 13 utilized in the invention are both of a well known type. Fig. 2 shows a cross sectional view of capacitor 13 and of its associated heater 14. The two electrodes of capacitor 13 consist respectively of a conductive deposit 30 on the outside of a ceramic tube 31 and of a similar deposit 32 on the inside of the tube. The ceramic tube may have different expansion characteristics and dielectric constants, to provide either an increase or a decrease in the capacitance of the system as its temperature is varied in one direction. Both the incremental capacitance, that is, the rate of change of capacitance with respect to temperature, and the total capacitance of such capacitors may be selected at will. Since such capacitors are well known in the art, they need not be described any further.

Both capacitors 12 and 13 are of the temperature compensating type. Capacitor 12, operating as the long term compensator, normally heats up at the same rate as the other capacitors and coils in circuit. Hence, by a suitable choice of this capacitor in the design of the circuit, compensation for long term frequency drift may be effected.

It is not feasible to compensate for the short term drift, due to the heating of the oscillator internal tube elements, by increasing the size of the compensating capacitor 12. This is due to the fact that any increase in the compensating capacitor 12 to correct for the initial short term drift, proves excessive for the long term drift, and results in over-compensation after the first few minutes of operation.

To be effective, the frequency compensating curve of the short term drift capacitor 13, must be the inverse of the frequency drift curve due to the heating of the oscillator internal tube elements. Referring to Fig. 3, curve 40 illustrates the variation of the current through the heater winding 15 of tube 1 after voltage from battery 16 is initially applied to time $t_0$. As is well known, the resistance of a heater winding in an electronic tube increases rapidly with temperature, so that the current starts off at a high value and rapidly decreases to a constant value. Thus, referring to curve 40, the current is essentially constant after time $t_1$.

Since a compensating capacitor, due to its thermal capacity has a considerable time lag in response to a changing ambient temperature, it is necessary to apply heat to capacitor 13 before the oscillator tube begins operating, if the short term drift is to be corrected. In other words, the short term compensating capacitor must be heated up very quickly just before the oscillator first goes into operation. Thereafter, the amount of heat supplied must be reduced to an appreciably lower figure.

In accordance with my invention, this requirement is met by the simple expedient of making use of the variation of current through heater winding 15 of the tube 1 to control the temperature of the short term compensator. Thus, referring to Fig. 2, the wire 34 has a substantial resistance and a certain length of it is inserted inside the tube 31 and is insulated therefrom through a cambric sleeve 35. In the actual circuit, the heater 14 thus constituted, is connected in series with the heater winding 15 of the tube 1. This arrangement constitutes the short term compensating capacitor 13 and associated heater 14, represented schematically in the circuit of Fig. 1.

Referring to Fig. 3, curve 42 shows the natural variation in frequency of the oscillator after operating potential is initially applied to it. In a typical construction of a radio receiver, the interval of time from $t_0$ to $t_1$ is normally approximately five minutes. Thus the frequency of oscillation initially decreases quite rapidly up to time $t_1$, illustrating the short term drift of the oscillator, and at a much lower rate thereafter, this lower rate illustrating the long term drift of the oscillator. Curve 41 illustrates the correction applied to the frequency of the oscillator by the temperature compensating capacitor 14, when its heater winding 13 is connected into the circuit as shown. This compensating curve is approximately the inverse of the natural drift curve 42, so that the resultant of the two is an essentially constant frequency.

In an actual construction of a radio receiver incorporating the temperature compensating system which I have described, it was observed that the maximum drift of the local oscillator starting with a cold receiver, that is a receiver which had been turned off and allowed to attain the ambient room temperature in all its parts, was less than 0.005%.

In Fig. 1, I have shown separate compensating capacitors for the long and for the short term frequency drifts. However, these two capacitors may be combined into a single capacitor with a heater winding. This is made possible by the fact that after the initial high current warming-up period, the current flowing through the heater winding is not sufficient to provide further temperature increase. The capacitor then warms up at the same rate as the surrounding components, thus providing long term compensation.

While a specific embodiment has been shown and described, it will, of course, be understood that various modifications may be made without departing from the invention. The appended claims are, therefore, intended to cover any such modifications within the true spirit and scope of the invention.

What I claim as new and desire to secure by Letters Patent of the United States, is:

1. An oscillator comprising an electron discharge device having a plurality of electrodes and a cathode heater winding, a resonant circuit connected to said electrodes, a temperature compensating capacitor in said resonant circuit and a resistance heater operating in conjunction with said capacitor to control the temperature thereof, said heater winding and said resistance heater being connected in series to a source of potential.

2. A temperature compensated oscillator comprising an electron discharge device having a plurality of electrodes and a cathode heater winding, a resonant circuit connected to said electrodes, a pair of temperature compensating capacitors in said resonant circuit, and a resistance heater operating in conjunction with one of said capacitors to control the temperature thereof, said heater winding and said resistance heater being connected in series to a source of potential.

3. An oscillator comprising an electron discharge device having electrodes including a cathode and a heater winding for heating said cathode, said heater being of the type wherein the current flowing therethrough, as a result of the application of a normal steady voltage, decreases as said heater reaches its operating temperature, a resonant circuit, connections from said electrodes to said circuit for sustaining oscillations therein, said circuit being subject to a short term drift in the frequency of said oscillations as a result of the heating of said electrodes, a compensating capacitor in said circuit, said capacitor having a predetermined incremental capacitance with respect to temperature changes, and a resistance physically mounted in close proximity to said capacitor, said resistance being connected in series with said heater and a source of potential for heating said capacitor, said incremental capacitance and said resistance being selected to compensate for said short term drift.

4. An oscillator comprising an electron discharge device having electrodes including a cathode and a heater winding for heating said cathode, said heater winding being of the type wherein the current flowing therethrough, as a result of the application of a normal steady voltage, decreases as said heater reaches its operating temperature, a resonant circuit, connections from said electrodes to said circuit for sustaining oscillations therein, said circuit being subject to a short term drift in the frequency of said oscillations as a result of the heating of said electrodes and to a long term drift as a result of an overall increase in the operating temperature of said circuit, a pair of compensating capacitors in said circuit, said capacitors having predetermined incremental capacitances with respect to temperature changes, one of said capacitors having an incremental capacitance selected to compensate for said long term drift, and a resistance physically mounted in close proximity to said other capacitor, said resistance being connected in series with said heater winding and a source of potential for heating said other capacitor, the incremental capacitance of said other capacitor and said resistance being selected to compensate for said short term drift.

JOSEPH A. WORCESTER, Jr.

REFERENCES CITED

The following references are of record in the file of this patent:

UNITED STATES PATENTS

| Number | Name | Date |
|---|---|---|
| 2,019,765 | Osnos | Nov. 5, 1935 |
| 2,093,331 | Lynn | Sept. 14, 1937 |
| 2,114,846 | Little | Apr. 19, 1938 |
| 2,151,752 | Ellis | Mar. 28, 1939 |
| 2,206,238 | Rochow | July 2, 1940 |
| 2,231,389 | Koffyberg | Feb. 11, 1941 |